United States Patent
Bergman et al.

(10) Patent No.: US 7,054,414 B2
(45) Date of Patent: May 30, 2006

(54) WIRELESS PHONE-INTERFACE DEVICE

(75) Inventors: John Todd Bergman, River Falls, WI (US); Kurt Hasselfeldt, Plymouth, MN (US); Thomas Anthony Lee, Lakeville, MN (US); Eric W. Lofstad, Eagan, MN (US); Brian Karl Seemann, Lakeville, MN (US)

(73) Assignee: Interactive Technologies Inc., North St. Paul, MN (US)

( * ) Notice: Subject to any disclaimer, the term of this patent is extended or adjusted under 35 U.S.C. 154(b) by 534 days.

(21) Appl. No.: 09/845,768

(22) Filed: May 1, 2001

(65) Prior Publication Data

US 2002/0163997 A1 Nov. 7, 2002

(51) Int. Cl.
*H04M 11/04* (2006.01)

(52) U.S. Cl. .............. 379/37; 379/40; 379/45

(58) Field of Classification Search ............ 379/37, 379/38, 39, 40–45, 49, 93.36; 340/506, 531, 340/539, 426
See application file for complete search history.

(56) References Cited

U.S. PATENT DOCUMENTS

| | | | | |
|---|---|---|---|---|
| 4,641,127 A | | 2/1987 | Hogan et al. ............... 379/40 |
| 4,803,719 A | * | 2/1989 | Ulrich .................... 379/399 |
| 4,855,713 A | | 8/1989 | Brunius ................... 340/506 |
| 4,887,290 A | * | 12/1989 | Dopp et al. ............ 379/93.36 |
| 4,951,029 A | | 8/1990 | Severson ................. 340/506 |
| 5,446,784 A | * | 8/1995 | Mac Taggart .......... 379/102.02 |
| 5,553,138 A | * | 9/1996 | Heald et al. ........... 379/93.36 |
| 5,686,885 A | | 11/1997 | Bergman ................. 340/514 |
| 5,686,896 A | | 11/1997 | Bergman ................. 340/636 |
| 5,717,379 A | * | 2/1998 | Peters ..................... 379/38 |
| 5,736,927 A | | 4/1998 | Stebbins et al. .......... 340/506 |
| 5,761,206 A | | 6/1998 | Kackman ................. 370/476 |
| 5,770,996 A | | 6/1998 | Severson et al. ...... 340/310.08 |
| 5,790,040 A | | 8/1998 | Kreier et al. ............ 340/693 |
| 5,799,062 A | | 8/1998 | Lazzara et al. ............ 379/51 |
| 5,805,063 A | | 9/1998 | Kackman ................. 340/539 |
| 5,809,013 A | | 9/1998 | Kackman ................. 370/253 |
| 5,870,022 A | | 2/1999 | Kuhnly et al. ............ 340/567 |
| 5,872,512 A | | 2/1999 | Kackman et al. .......... 340/507 |
| 5,942,981 A | | 8/1999 | Kackman ................. 340/636 |
| 6,104,785 A | | 8/2000 | Chen ...................... 379/49 |
| 6,204,760 B1 | | 3/2001 | Brunius .................. 340/529 |
| 6,288,639 B1 | * | 9/2001 | Addy ...................... 340/539 |
| 6,442,240 B1 | * | 8/2002 | Otto ....................... 379/37 |

OTHER PUBLICATIONS

"685 Digital Reciever", *Ademco Group*, http://www.ademco.com/ademco/685.htm, pp. 1–4, (2000).
"DSC Power 832 Security System", *Digital Security Controls*, http://www.dscsec.com/p832techspec/p832techspec.htm, pp. 1–12, (2000).
"How do I . . . Wire an RJ31X Jack?", *HomeTech Solutions*, http://www.hometech.com/learn/rj31x.html, pp. 1–7, (1995).
"Wireless User–Interface Devices", *Ademco Group*, http://www.ademco.com/ademco/user.htm, pp. 1–2, (1999).
"Daitem, the fully wireless security", *Daitem*, http:/www.daitem.com/export_en/, pp. 1–6, (1983).
"Daitem Security System", 1 Page.

* cited by examiner

*Primary Examiner*—Melur Ramakrishnaiah
(74) *Attorney, Agent, or Firm*—Eugene Hyun, Esq.; Armstrong Teasdale LLP

(57) ABSTRACT

A phone-interface device receives a wireless signal from a control panel. The wireless signal encodes information regarding a system condition that has occurred in a facility. The phone-interface device communicates the system condition to a monitoring station. The phone-interface device receives its electrical power from the telephone line or from an energy storage device. In another aspect, the phone-interface device receives a provisional-alarm signal command from a control panel. The phone-interface device determines whether a disarm command has been received from the control panel. When a disarm command has not been received before expiration of a period of time, the phone-interface devices sends an alarm condition to a monitoring station.

27 Claims, 14 Drawing Sheets

WIRELESS PHONE-INTERFACE DEVICE

FIELD OF THE INVENTION

The present invention relates generally to security systems and components that operate in security systems. More particularly, the present invention relates to a wireless phone-interface device within a security system.

COPYRIGHT NOTICE/PERMISSION

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever. The following notice applies to the software and data as described below and in the drawings hereto: Copyright© Interactive Technologies, Incorporated, 2000. All Rights Reserved.

BACKGROUND OF THE INVENTION

In a security system, a control panel receives signals from security devices distributed throughout a monitoring area, such as a home, business, or warehouse, to monitor various sensor events. The security devices placed throughout the monitoring area might include door/window sensors, glass-break sensors, motion detectors, temperature sensors, smoke sensors, and the like. When a sensor event is sensed, such as a door/window open, movement, smoke, or fire, the sensor sends a sensor event to a control panel, which based on its installation programming and current user setting determines the appropriate system response. In some cases, the control panel will start an entry delay period, in others, e.g. a fire, the control panel may sound an immediate alarm. A system response such as entry delay, can lead to further system actions, such as an alarm and a report of the system condition to an off-premises monitoring station, such as a monitoring company central station, fire station, or police station.

Security systems typically delay reporting some system conditions to the monitoring station for some period of time sufficient to allow a valid user time to disarm the system, that is to change the system state from entry delay to disarmed, prior to the expiration of an entry delay timer and therefore prevent an alarm and consequently an alarm report to the monitoring station. This delay in entering the alarm state is called "entry delay," as opposed to "dialer delay," which is an additional time delay between when the control panel enters the alarm state and when the dialer actually reports the alarm via a telephone call to the monitoring station.

Current self-contained security systems—with the user interface, dialer, siren, and processing functions integrated into a single unit—are vulnerable to attack because the entry delay time period gives an unauthorized intruder time to break open and disable the control panel dialer before the control panel has reported the system condition via the dialer. Also, for ease of installation and consumer convenience, the user interface is typically located near the normal premise entry point, which makes it easy for the intruder to find the dialer since they are integrated together. Further, the low-level siren emits sounds during the entry delay period, which are intended to prompt the valid user to disarm the system. But, the siren also aids the intruder in finding the self-contained security system including the critical dialer.

Current hardwired and wireless self-contained security systems typically run a wire from the control panel to the telephone demarcation point (the "head in" point) prior to all telephone sets in the facility. This distance can be quite long, or the ability to install the wire may be very difficult, which makes installation expensive. This wire to the demarcation point is necessary because the security system must be able to seize the telephone line, so that the security system can report a system condition to the monitoring station even if a premise's telephone-set receiver is off-hook. Line seizure means that the control panel disconnects all other premise telephones.

Another disadvantage of current security systems is the expense in isolating the telephone line from alternating current (AC) used by the control panel. Telephone companies, government regulations, and/or safety standards require electrical isolation in order to provide product reliability and ensure customer safety. This is commonly accomplished with an isolation transformer, a transient surge-protection device, and/or other expensive components installed in the control panel, which electrically isolate the AC power from the telephone line and ensure safety.

Thus, a significant need exists for methods and systems that reduce the costs of obtaining security protection and that provide better protection against unauthorized intruders.

SUMMARY OF THE INVENTION

The present invention provides solutions to the above-described shortcomings in conventional approaches, as well as other advantages apparent from the description below. The present invention is a method, system, apparatus, and program product related to a wireless phone-interface device in a security system.

In one aspect, a phone-interface device receives a wireless signal from a control panel. The wireless signal encodes information regarding a system condition that has occurred in a facility. The phone-interface device communicates the system condition to a monitoring station. The phone-interface device receives its electrical power from an energy storage device and/or the telephone line. In this way, the cost of installing a wire from the control panel to the phone-interface device and from the phone interface to an alternating current source is avoided, and the system cost is lower because electrical isolation of the telephone line from alternating current is achieved through the partitioning of system components instead of through expensive isolation equipment.

In another aspect the phone-interface device, which is packaged separately from a control panel, receives a provisional-alarm signal system condition from the control panel. When a disarm command has not been received from the control panel before expiration of a period of time, the phone-interface devices sends a system condition to a monitoring station. In this way, the security system defeats an unauthorized intruder who breaks into the facility and disables the control panel.

DETAILED DESCRIPTION OF THE INVENTION

In the following detailed description of exemplary embodiments of the invention, reference is made to the accompanying drawings (where like numbers represent like elements) that form a part hereof, and in which is shown by way of illustration specific exemplary embodiments in which the invention may be practiced. These embodiments are described in sufficient detail to enable those skilled in the art to practice the invention, but other embodiments may be utilized and logical, mechanical, electrical, and other changes may be made without departing from the scope of the present invention. The following detailed description is, therefore, not to be taken in a limiting sense, and the scope of the present invention is defined only by the appended claims.

Figure 1:
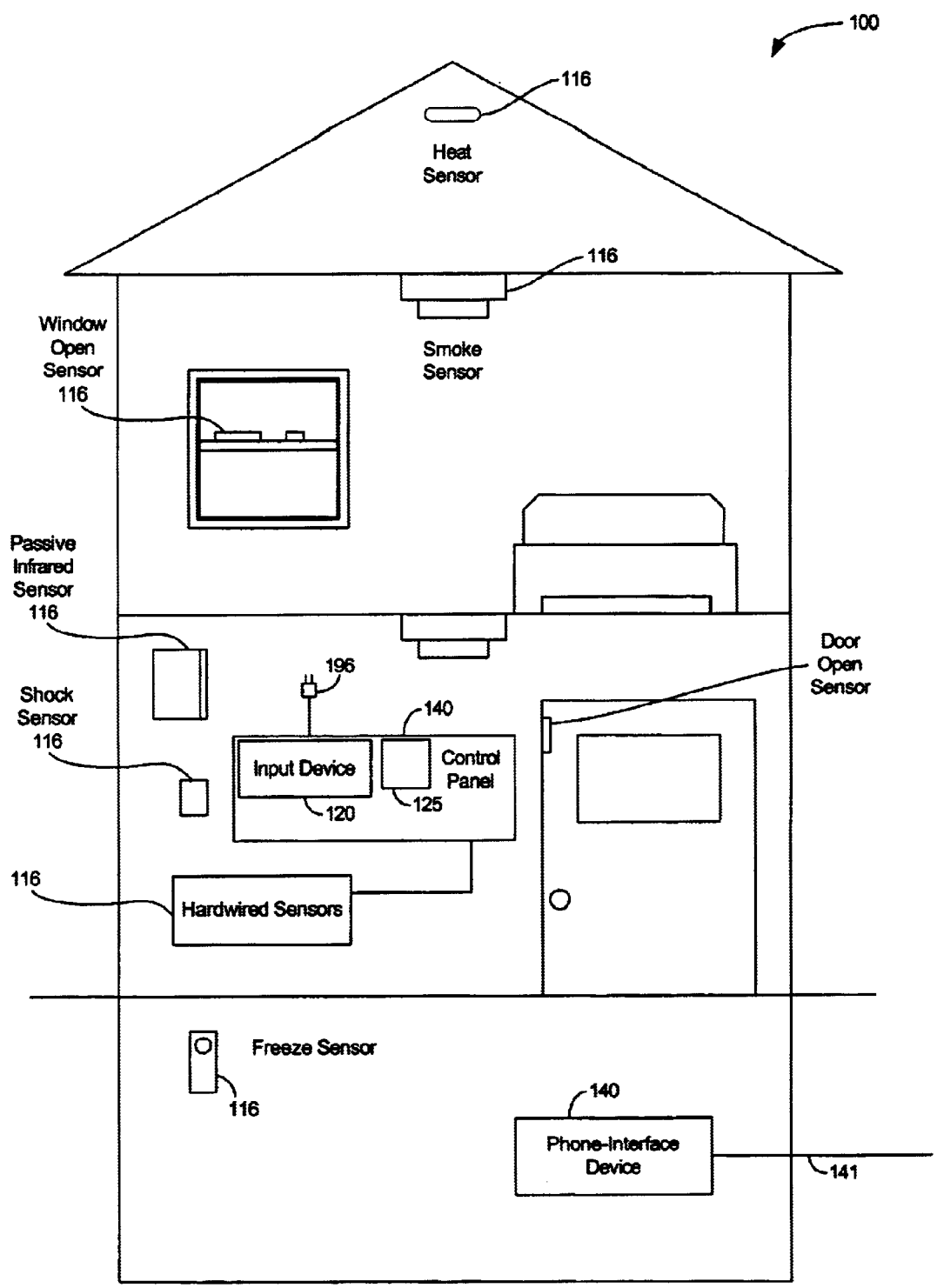
FIG. 1 illustrates a pictorial example of a facility with a security system, according to an embodiment of the invention.

FIG. 1 depicts a pictorial example of a facility with a security system, according to an embodiment of the invention. Facility 100 includes security system 112. In one embodiment facility 100 is a house, but in other embodiments facility 100 can be a business, warehouse, or any other type of structure needing security. For protection against intruder tampering, control panel 114 ordinarily is locked in a durable housing and placed in a remote location within facility 100, unless it is a self-contained panel. Control panel 114 optionally activates siren 125 and transmits system conditions to phone-interface device 140. Phone-interface device 140 uses communications link 141 to transmit system conditions to an unillustrated off-premises monitoring station, such as a monitoring company central station, fire station, or police station. In one embodiment, communications link 141 is a telephone line. In another embodiment, communications link 141 is an ISDN (Integrated Services Digital Network) line. In another embodiment, communications link 141 uses wireless communications. In other embodiments, any appropriate communications link can be used.

Security devices 116 placed throughout the monitoring area might include door/window open sensors, glass-break sensors, motion detectors, temperature sensors, smoke sensors, infrared sensors, shock sensors, and the like. When security device 116 senses its respective event, the sensor sends a sensor event to control panel 114. In one embodiment, security devices 116 are hardwired to control panel 114. In another embodiment, selected ones or all of the security devices are wireless, in which case the wireless security device includes a wireless transmitter, and control panel 114 includes a wireless receiver.

Security system 112 also can include input devices 120 for user communication with control panel 114. Input devices 120 are shown mounted within control panel 114, but in other embodiments, input devices 120 are packaged separately. Input devices 120 can be hardwired to control panel 114 or wireless. In some embodiments, the wireless input device can take the form of a portable, wireless unit such as a portable keypad or keychain fob. In other embodiments, input devices 120 are mounted on a wall. An authorized user enters information into the input device to access the control panel. In particular, the user can selectively arm and disarm the security system by entering appropriate information. Also, the user can obtain system status information using the input device, which may provide visual or audible feedback.

In one embodiment, control panel 114 receives alternating electric current via A/C plug 196.

Figure 2:
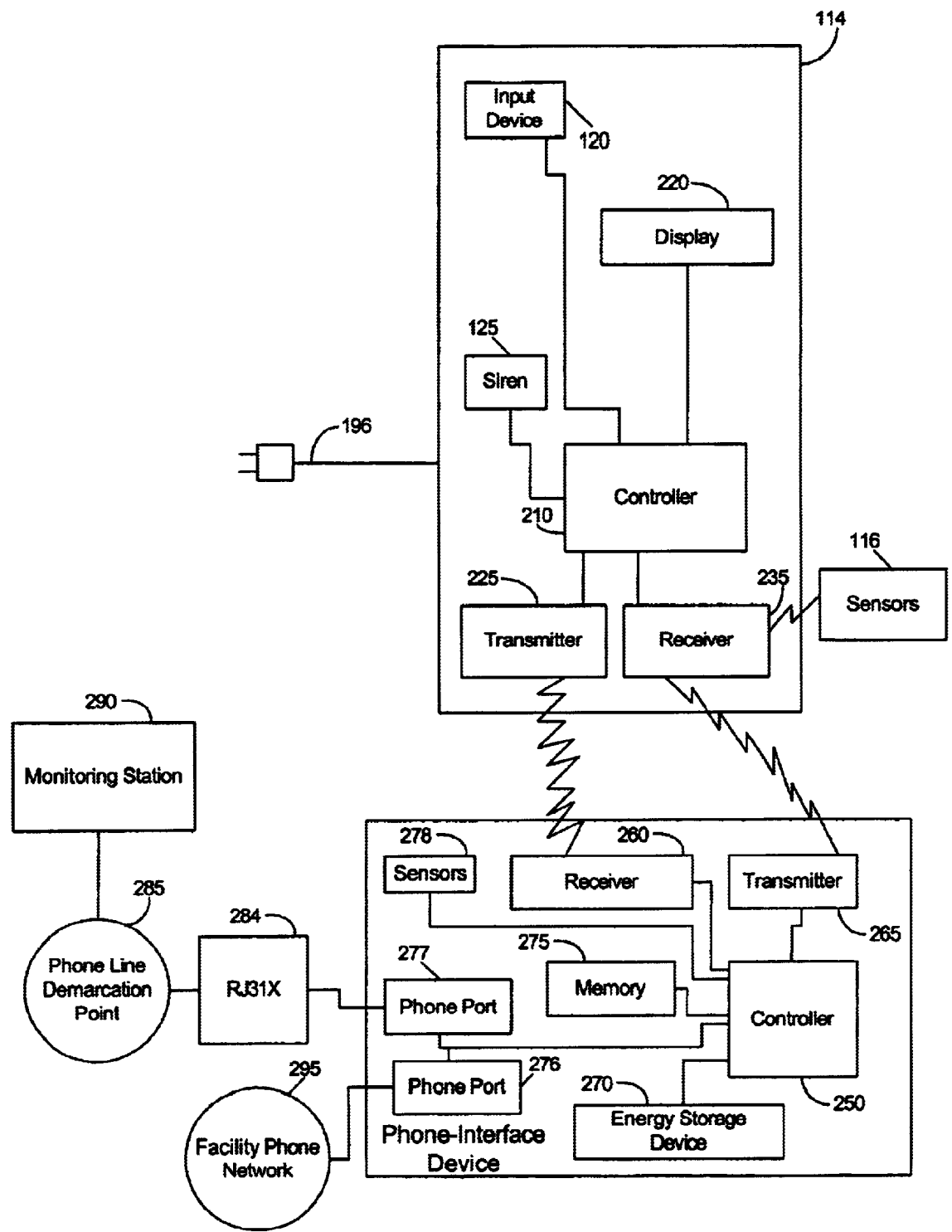
FIG. 2 illustrates a block diagram showing additional detail for selected elements of the security system.

FIG. 2 depicts a block diagram showing additional detail for selected components of the security system of FIG. 1. Control panel 114 is shown receiving signals from sensors 116 and input device 120. Control panel 114 is also shown sending and receiving signals to and from phone interface device 140. Phone interface device 140 is connected via RJ31X jack 284 at phone line demarcation point 285 to a telephone network, which enables phone interface device 140 to transmit and receives signals to and from monitoring station 290. RJ31X jack 284 is a telephone jack that connects alarm equipment to a telephone line. In other embodiments, any appropriate jack can be used. Phone interface device 140 is also connected to facility phone network 295, which is the network of telephones in facility 100.

Control panel 114 contains controller 210, which is coupled to display 220, transmitter 225, and receiver 235. Receiver 235 receives wireless signals containing sensor events and control information from sensors 116 and input device 120. Input devices 120 are shown mounted within control panel 114, but in other embodiments, input devices 120 are packaged separately. Input devices 120 can be hardwired to control panel 114 or wireless. In one embodiment receiver 235 receives RF (radio frequency) signals. In another embodiment, some or all of sensors 116 and input device 120 are hardwired to control panel 114. Receiver 235 provides the received sense events and to controller 210.

Controller 210 further processes the received information and derives system condition and control information from sense events and other settings and programming information. When appropriate, controller 210 transmits information to siren 125 to cause siren 125 to emit an audio alarm or entry delay beeps for prompting the user to disarm the system. Controller 210 also transmits information to and receives information from phone-interface device 140 via transmitter 225 and receiver 235, as further described below with reference to FIGS. 3–5, 7A, and 8B. Controller 210 further causes display 220 to display status information to the user. In one embodiment, transmitter 225 transmits RF signals.

Although input device 120 and siren 125 are shown enclosed within control panel 114, in another embodiment either or both are packaged separately from control panel 114.

In one embodiment, control panel 114 receives alternating electric current via A/C plug 196.

Phone-interface device 140 includes controller 250 coupled to receiver 260, transmitter 265, energy storage device 270, memory 275, phone ports 276 and 277, and sensors 278. Receiver 260 receives signals from transmitter 225. Transmitter 265 sends signals to receiver 235. The operation of controller 250 is further described below with reference to FIGS. 4, 5, 6A, 6B, 7B, 8A, 9, and 10–20. In one embodiment, memory 275 is volatile memory such as RAM (Random Access Memory). In another embodiment, memory 275 is non-volatile memory such as a diskette in a diskette drive, a hard disk in a hard-disk drive, or a CD-ROM in a CD-ROM drive.

Controller 210 draws energy from energy storage device 270 and distributes it to receiver 260, transmitter 265, memory 275, and phone ports 276 and 277. In another embodiment, energy storage device 270 is connected directly to receiver 260, transmitter 265, memory 275, and phone ports 276 and 277. In one embodiment, energy storage device 270 is a battery. In another embodiment, energy storage device 270 is a capacitor.

Phone port 277 connects to phone line demarcation point 285. Phone port 277 operates to seize the telephone line, dial, and receive electrical energy through the telephone line, as further described below with reference to FIGS. 3–8B and 10–20. Phone port 277 further senses information about the telephone line and relays it to controller 250, which transmits it to control panel 114 via transmitter 265. Examples of this sense information includes dial tone/cadence, ring/cadence, line cut, line voltage, line current, caller id, and touch tone signals. Telephone signals pass between controller 250 and monitoring station 290 through phone port 277.

Phone port 276 connects to facility phone network 295. Telephone signals also pass from phone port 276 to facility phone network 295.

Sensors 278 sense trouble conditions in phone-interface device 140 and report them to controller 250, which transmits data about the trouble conditions to control panel 114 via transmitter 140. Examples of trouble conditions include removal of phone port 277 from the phone line, removal of the cover of phone-interface device 140, removal of phone-interface device 140 from its mounting, and low battery or power-supply trouble.

In one embodiment, controller 210 and controller 250 carry out their functions using hardware components, such as logic gates or programmable logic devices. In another embodiment, one or both of controller 210 and 250 are implemented using a computer processor that executes instructions contained in memory. The instructions defining the functions of this embodiment can be delivered to controller 210 and/or controller 250 via a variety of signal-bearing media, which include, but are not limited to:

(1) information permanently stored on non-writeable storage media (e.g., read only memory devices within a computer such as CD-ROM disks) readable by an unillustrated CD-ROM drive;

(2) alterable information stored on writeable storage media (e.g., floppy disks within a diskette drive, tape drive, or hard-disk drive); or (3) information conveyed to controller 210 and/or controller 250 by a communications media, such as through a computer or telephone network including wireless communications.

Such signal-bearing media, when carrying computer-readable instructions that direct the functions of the present invention, represent embodiments of the present invention.

The configuration depicted in FIG. 2 is but one possible implementation of the components depicted in FIG. 1, and an embodiment of the invention can apply to any hardware configuration that provides a wireless telephone interface device.

Figure 3:
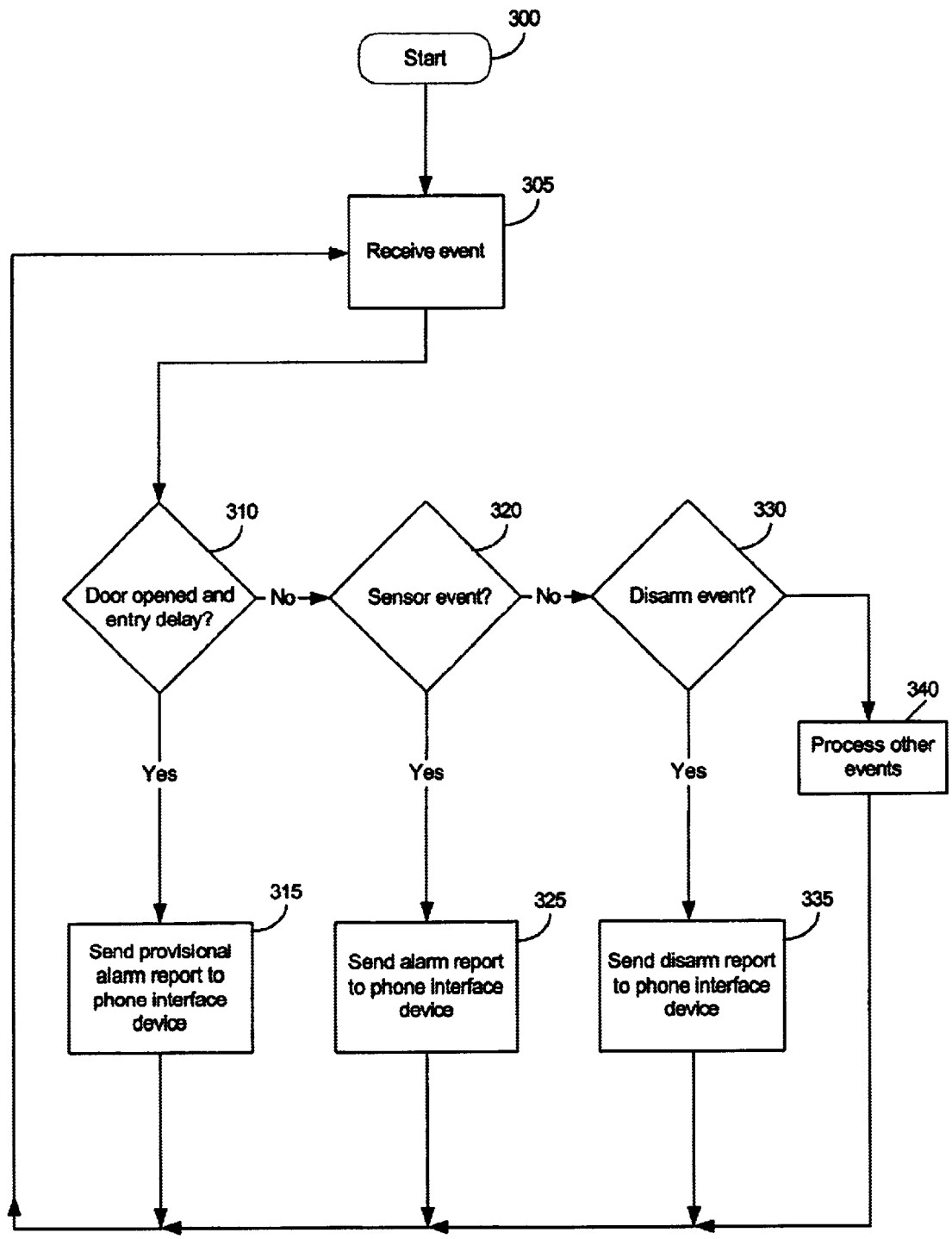
FIG. 3 illustrates a flowchart that describes a method at a control panel for receiving and processing events, according to an embodiment of the invention.

FIG. 3 illustrates a flowchart that describes a method at control panel 114 for receiving and processing events, according to an embodiment of the invention. Control begins at block 300. Control then continues to block 305 where controller 210 receives an event from input device 120 or receiver 235. Control then continues to block 310 where controller 210 determines whether the event previously received is a door opened and entry delay event. If a door was opened, then an authorized user needs entry delay time to disarm the security system, so if the determination at block 310 is true, then control continues to block 315 where controller 210 sends a provisional alarm report to phone-interface device 140. Control then returns to block 305, as previously described above.

If the determination at block 310 is false, then control continues to block 320 where controller 210 determines whether the event previously received is a sensor event from one of sensors 116 via receiver 235. If the determination at block 320 is true, then control continues to block 325 where controller 210 sends an alarm report to phone-interface device 140. Control then returns to block 305, as previously described above.

If the determination at block 320 is false, then control continues to block 330 where controller 210 determines whether the event previously received is a disarm event. A disarm event occurs as a result of a user entering a command to disarm the security system via input device 120. If the determination at bock 330 is true, then control continues to block 335 where controller 210 sends a disarm report to phone-interface device 140. Control then returns to block 305, as previously described above.

If the determination at block 330 is false, then control continues to block 340 where controller 210 processes other events.

Figure 4:
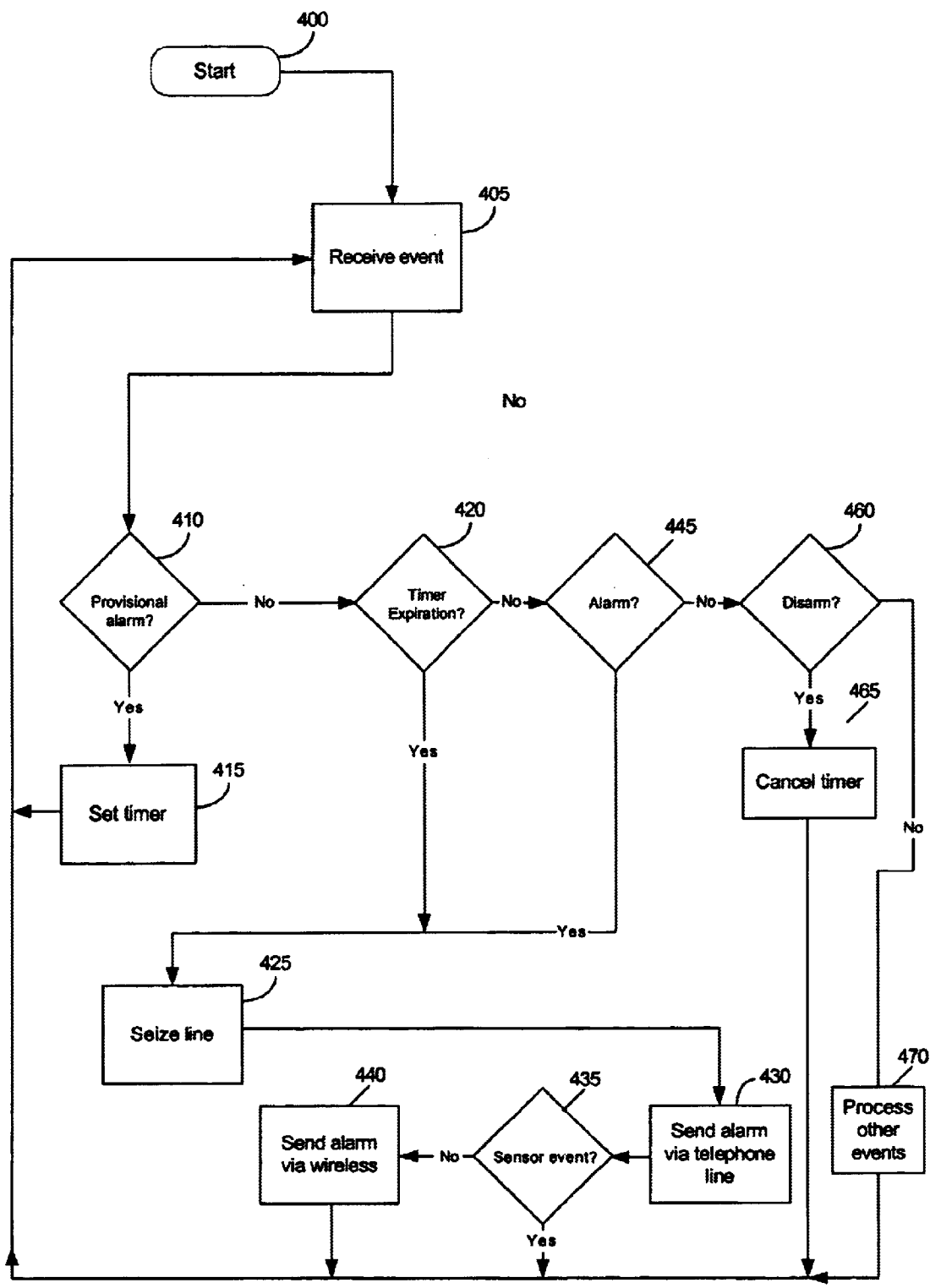
FIG. 4 illustrates a flowchart that describes a method at a phone-interface device for receiving and processing events, according to an embodiment of the invention.

FIG. 4 illustrates a flowchart that describes a method at phone-interface device 140 for receiving and processing events, according to an embodiment of the invention. Control begins at block 400. Control then continues to block 405 where phone-interface device 140 receives an event from control panel 114 or an event internal to phone-interface device 140.

Control then continues to block 410 where controller 250 determines whether the event previously received is a provisional alarm report from control panel 114. If the determination at block 410 is true, then control continues to block 415 where controller 250 sets a timer to a period of time. In one embodiment, the timer is an unillustrated hardware timer in phone-interface deice 140. In another embodiment the timer is a software timer. Control then returns to block 405, as previously described above.

If the determination at block 410 is false, then control continues to block 420 where controller 250 determines whether the event previously received is a timer expiration event. If the determination at block 420 is true, then a period of time has elapsed since the last provisional alarm without receiving a disarm report from control panel 114, so an alarm needs to be communicated to monitoring station 290. Control then continues to block 425 where controller 250 seizes the telephone line. Control then continues to block 430 where controller 250 sends an alarm report to monitoring station 290 via the telephone line. Control then continues to block 435 where controller 250 determines whether the alarm call at block 430 was successful. If the determination at block 435 is true, then control returns to block 405, as previously described above. If the determination at block 435 is false, then control continues to block 440 where controller 250 sends the alarm to monitoring station 290 via a wireless telephone. Control then returns to block 405, as previously described above.

If the determination at block 420 is false, then control continues to block 445 where controller 250 determines whether the event previously received is an alarm event. If the determination at block 445 is true, then control continues to block 425, as previously described above.

If the determination at block 445 is false, then control continues to block 460 where controller 250 determines whether the event previously received is a disarm event from control panel 114. If the determination at block 460 is true, then a disarm report has been received, which cancels the previous provisional alarm report, so there is no need to send an alarm to monitoring station 290. Thus, control then continues to block 465 where controller 250 cancels the timer if it was previously set. Control then returns to block 405, as previously described above.

If the determination at block 460 is false, then control continues to block 470 where controller 250 processes other events. Control then returns to block 405, as previously described above.

Figure 5:
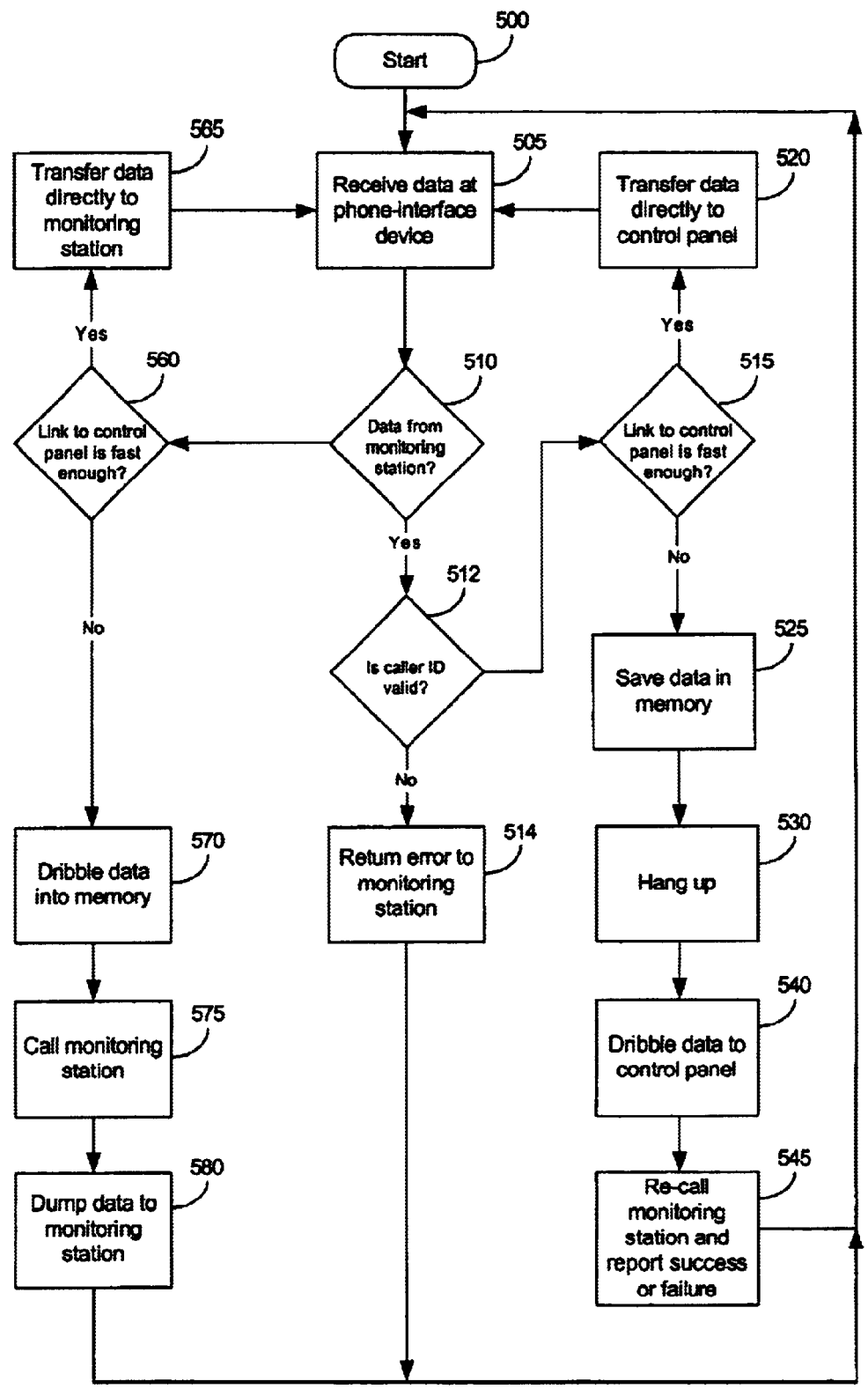
FIG. 5 illustrates a flowchart that describes a method at a phone-interface device for transferring data between a control panel and a monitoring station, according to an embodiment of the invention.

FIG. 5 illustrates a flowchart that describes a method at phone-interface device 140 for transferring data between control panel 114 and monitoring station 290, according to an embodiment of the invention. Control begins at block 500. Control then continues to block 505 where phone-interface device 140 receives data. In one embodiment, the data received is configuration data, which can include an account number. The data received can be either from monitoring station 290 or from control panel 114.

Control then continues to block 510 where controller 250 determines whether the received data was from monitoring station 290. If the determination at block 510 is true, control then continues to block 512 where controller 250 optionally determines using caller id whether the calling originates from an authorized monitoring station. If the determination at block 512 is false, then control continues to block 514 where controller 250 returns an error to the caller.

If the determination at block 512 is true, then control continues to block 515 where controller 250 determines whether the link between phone-interface device 140 and control panel 114 is fast enough to keep up with the data transfer between monitoring station 290 and phone interface device 140. If the determination at block 515 is true, then control continues to block 520 where controller 250 transfers the data to control panel 114 via transmitter 265 as the data is received from monitoring station 290 in real time. Control then returns to block 505, as previously described above.

If the determination at block 515 is false, then the link between phone-interface device 140 and control panel 114 is not fast enough to keep up with the data transfer between monitoring station 290 and phone interface device 140, so control continues to block 525 where controller 250 saves the data in memory 275. Once the data transfer between monitoring station 290 and phone-interface device 140 is complete, control continues to block 530 where controller 250 hangs up the telephone. Control then continues to block 540 where controller 250 dribbles the saved data to control panel 114 via transmitter 265 at a data rate that the link between control panel 114 and phone-interface device 114 can handle. Once the data transfer is complete, control continues to block 545 where phone-interface device 140 rec-calls monitoring station 290 to report success or failure of the data transfer. Control then returns to block 505, as previously described above.

If the determination at block 510 is false, then the received data is from control panel 114, so control continues to block 560 where controller 250 determines whether the link between phone-interface device 140 and control panel 114 is fast enough to keep up with the data transfer between monitoring station 290 and phone interface device 140. If the determination at block 560 is true, then control continues to block 565 where controller 250 transfers the data to monitoring station 290 as the data is received from control panel 114 in real time. Control then returns to block 505, as previously described above.

If the determination at block 560 is false, then the link between phone-interface device 140 and control panel 114 is not fast enough to keep up with the data transfer between monitoring station 290 and phone interface device 140, so control continues to block 570 where controller 250 dribbles the data in memory 275. Once the data transfer between control panel 114 and phone-interface device 140 is complete, control continues to block 575 where controller 250 calls monitoring station 290. Control then continues to block 580 where controller 250 dumps the data to monitoring station 290. In another embodiment, controller 250 converts sequences of DTMF tones from control panel 114 into a command and sends the command to monitoring station 290 instead of sending DTMF tones. Once the data transfer is complete, control returns to block 505, as previously described above.

Figure 6A:
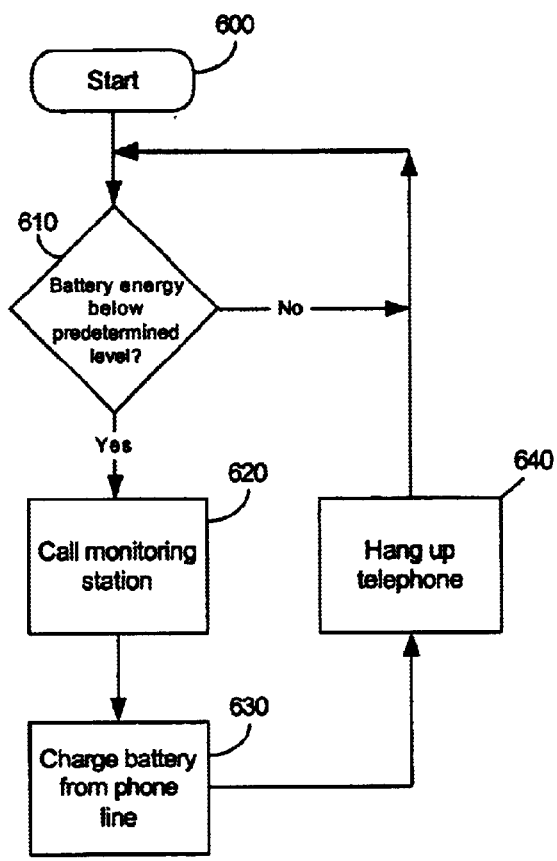
FIG. 6A illustrates a flowchart that describes a method at a phone-interface device for charging an energy storage device from a phone line, according to an embodiment of the invention.

FIG. 6A illustrates a flowchart that describes a method at phone interface device 140 for charging energy storage device 270 from a phone line, according to an embodiment of the invention. Control begins at block 600. Control then continues to block 610 where controller 250 determines whether energy storage device 270 has low electrical power. If the determination at block 610 is false, then control returns to block 610, as previously described above.

If the determination at block 610 is true, then control continues to block 620 where controller 250 places a call to monitoring station 290. In another embodiment, instead of placing a call to monitoring station 290, controller 250 sends a message to control panel 114 using transmitter 265, and control panel 114 determines the appropriate next action. Control then continues to block 630 where controller charges energy storage device 270 from the telephone line in various states, such as ringing, while checking the line for proper voltages or currents, while dialing, during a connected call, or after the off-site call party has hung up. Controller 250 adjusts its electrical interface to the phone line so that the entire facility phone system presents the proper current and voltage profile to the outside phone line. That is, controller 250 draws the leftover energy that is available beyond what the facility phone system needs, per telephone company regulations. Control then continues to block 640 where controller 250 hangs up the telephone. Control then returns to block 610, as previously described above.

Figure 6B:
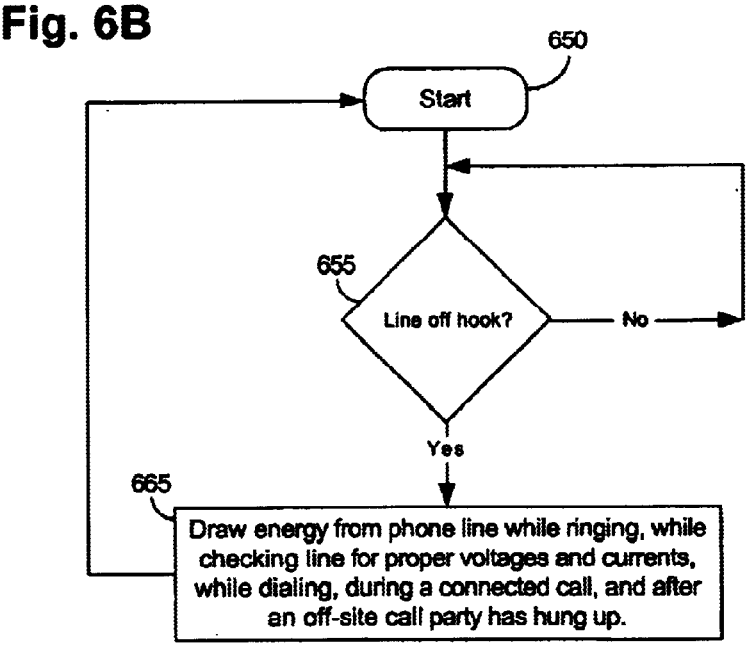
FIG. 6B illustrates a flowchart that describes a method at a phone-interface device for charging an energy storage device from a phone line, according to an embodiment of the invention.

FIG. 6B illustrates a flowchart that describes a method at phone-interface device 140 for charging energy storage device 270 from a phone line, according to an embodiment of the invention. Control begins at block 650. Control then continues to block 655 where controller 250 determines whether any of the phones in facility 100 are off-hook. If the determination at block 655 is false, control then returns to block 655, as previously described above. In other embodiment, the logic of block 655 is not used, and instead control continues directly from block 650 to block 665, as further described below.

If the determination at block 655 is true, then control continues to block 665 where controller 250 draws energy from the phone line in various states, such as ringing, while checking the line for proper voltages or currents, while dialing, during a connected call, and after an off-site call party has hung up. Controller 250 adjusts its electrical interface to the phone line so that the entire facility phone system presents the proper current and voltage profile to the outside phone line. That is, controller 250 draws the leftover energy that is available beyond what the facility phone(s) need, but yet within regulatory allowances.

Figure 7A:
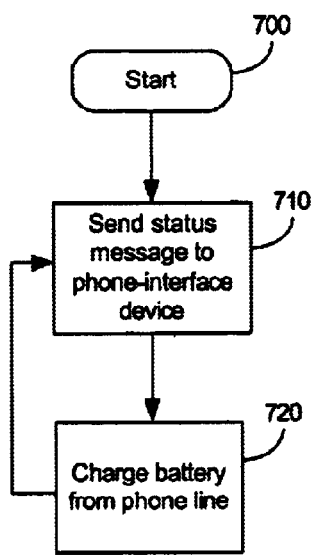
FIG. 7A illustrates a flowchart that describes a method at a control panel for sending a status message to a phone-interface device, according to an embodiment of the invention.
Figure 7B:
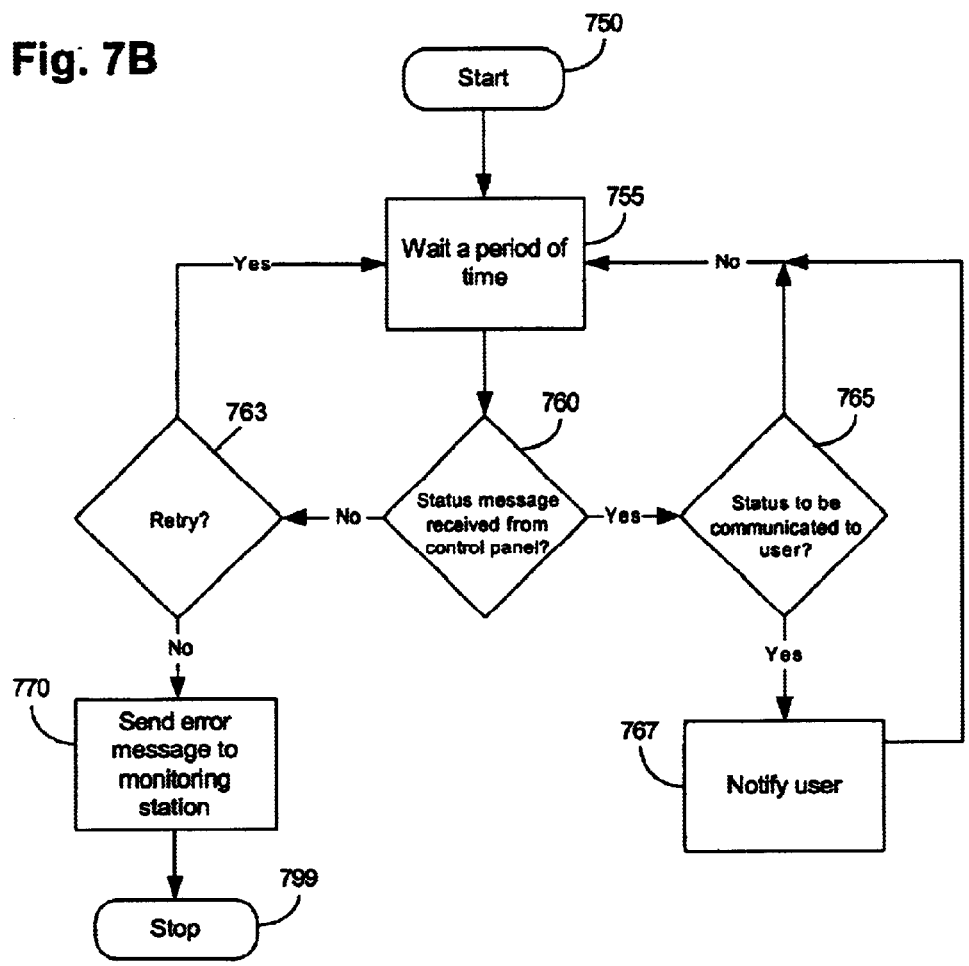
FIG. 7B illustrates a flowchart that describes a method at a phone-interface device for detecting when a control panel has an error condition.
Figure 8A:
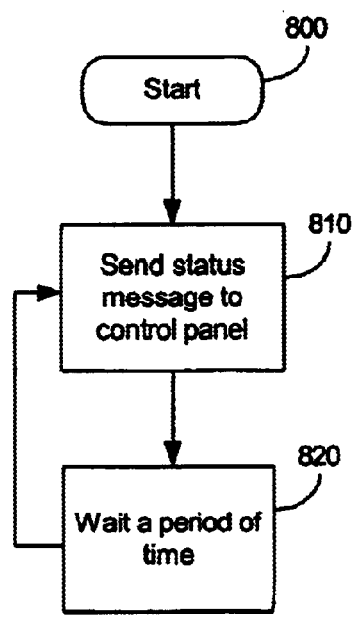
FIG. 8A illustrates a flowchart that describes a method at a phone-interface device for sending a status message to a control panel, according to an embodiment of the invention.
Figure 8B:
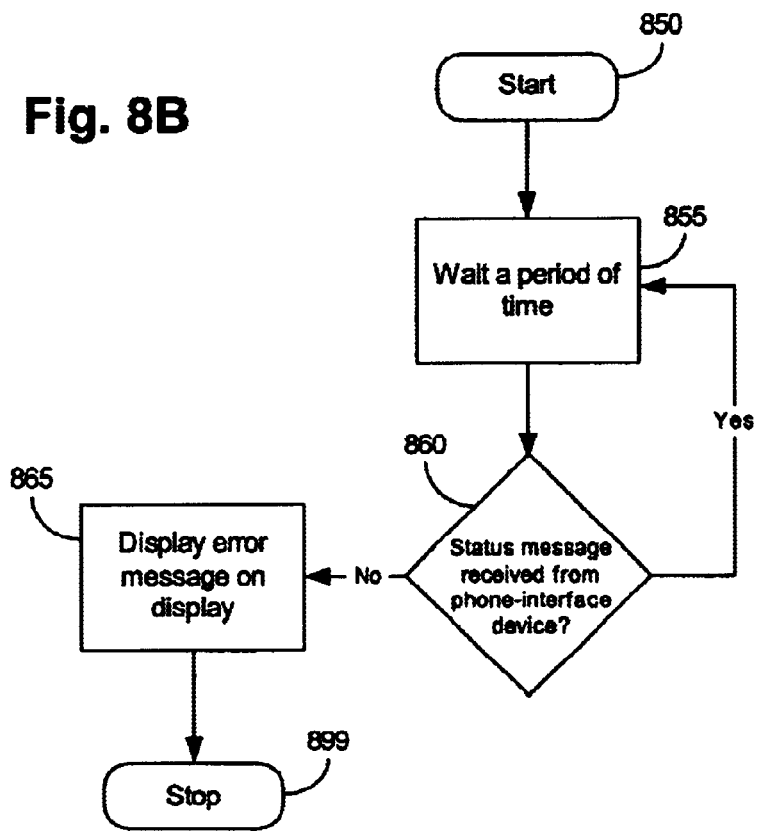
FIG. 8B illustrates a flowchart that describes a method at a control panel for detecting when a phone-interface device has an error condition.

FIGS. 7A and 7B illustrate an embodiment for defeating an intruder who breaks into a facility and disables the control panel prior to the control panel reporting the system condition because of the entry delay previously described above. FIGS. 8A and 8B illustrate another embodiment for defeating the intruder.

FIG. 7A illustrates a flowchart that describes a method at control panel 114 for sending a status message to phone-interface device 140, according to an embodiment of the invention. Control begins at block 700. Control then continues to block 710 where controller 210 sends a status message to phone-interface device 140 via transmitter 225. Control then continues to block 720 where controller 210 waits for a period of time. Control then returns to block 710, as previously described above.

FIG. 7B illustrates a flowchart that describes a method at phone-interface device 140 for detecting when control panel 114 has an error condition. Control begins at block 750. Control then continues to block 755 where controller 250 waits for a period of time. Control then continues to block 760 where controller 250 determines whether a status message has been received from control panel 114 via receiver 260. If the determination at block 760 is true, then control continues to block 765 where controller 250 determines whether the status message contains information that needs to be communicated to the user. If the determination at block 765 is true, then control continues to block 767 where controller notifies the user of the status. In one embodiment, controller 250 pages the user. In still another embodiment, controller 250 calls an off-premises phone. If the determination at block is false, then control returns to block 755, as previously described above.

If the determination at block 760 is false, then control continues to block 763 where controller 250 determines whether to retry by waiting further. If the determination at block 763 is true, then control returns to block 755 as previously described above. If the determination at block 763 is false, then control continues to block 770 where controller 250 sends an error message to monitoring station 290 indicating that control panel 114 is inoperative. Control then continues to block 799 where the function ends.

FIG. 8A illustrates a flowchart that describes a method at phone-interface device 140 for sending a status message to control panel 114, according to an embodiment of the invention. Control begins at block 800. Control then continues to block 810 where controller 250 sends a status message to control panel 114. Control then continues to block 820 where controller 250 waits for a period of time. Control then returns to block 810, as previously described above.

FIG. 8B illustrates a flowchart that describes a method at control panel 114 for detecting when phone-interface device 140 has an error condition. Control begins at block 850. Control then continues to block 855 where controller 210 waits for a period of time. Control then continues to block 860 where controller 210 determines whether a status message has been received from phone-interface device 140. If the determination at block 860 is true, then control returns to block 855, as previously described above. If the determination at block 860 is false, then control continues to block 865 where controller 210 displays an error message on display 220, indicating that phone-interface device 140 is inoperative. Control then continues to block 899 where the function returns.

Figure 9:
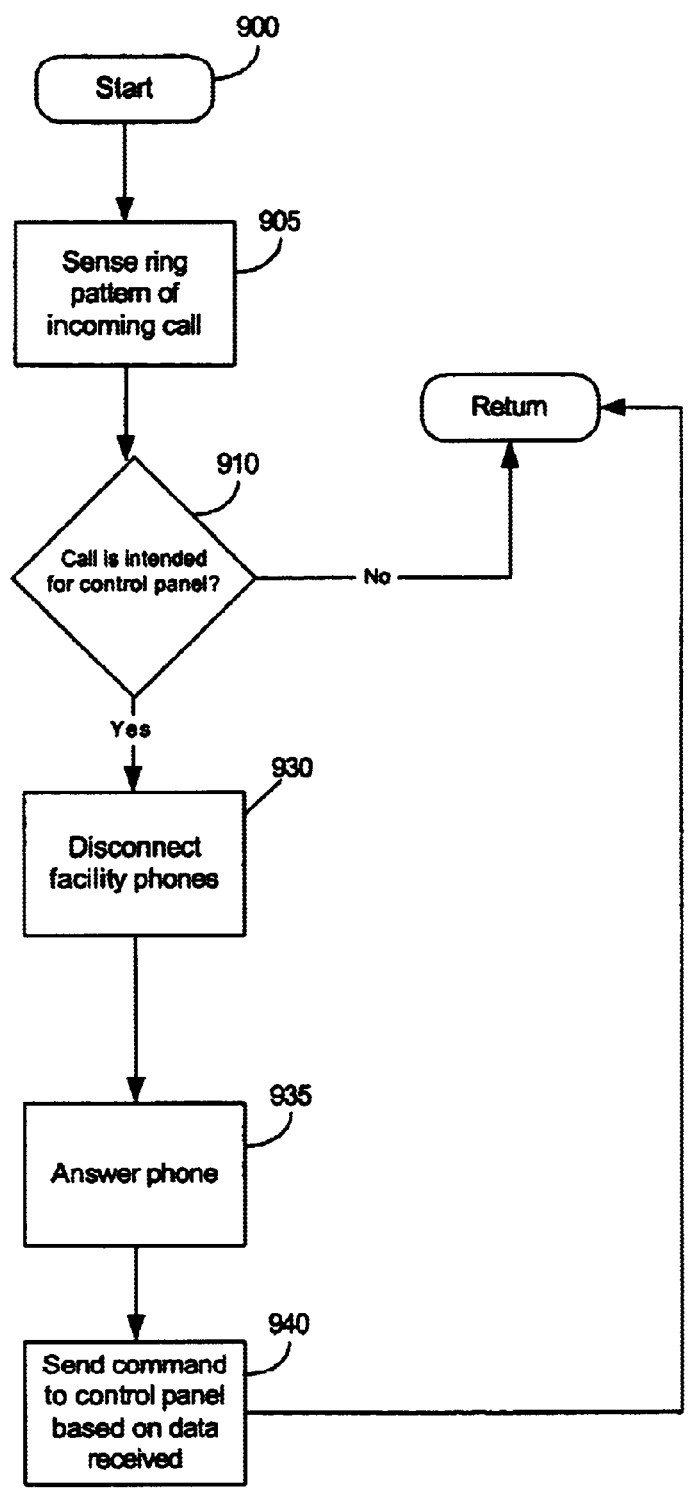
FIG. 9 illustrates a flowchart that describes a method at a phone-interface device for receiving telephone calls, according to an embodiment of the invention.

FIG. 9 illustrates a flowchart that describes a method at phone-interface device 140 for receiving telephone calls, according to an embodiment of the invention. Control begins at block 900. Control then continues to block 905 where controller 250 senses and determines the ring pattern of an incoming call. Control then continues to block 910 where controller 250 determines whether the call is intended for control panel 114 based on the ring pattern. If the determination at block 910 is false, then the call is not intended from the control panel, so control continues to block 999 where the function returns.

If the determination at block 910 is true, then control continues to block 930 where controller 250 disconnects the phones within facility phone network 295. Control then continues to block 935 where controller 250 answers the telephone call. Control then continues to block 940 where controller 250 analyzes the information transmitted in the telephone signal and sends the DTMF (Dual Tone Multi- Frequency, also known as "touch-tone") tones into codes and transmits the codes to control panel 114 via transmitter 265. In another embodiment, controller 250 translates the DTMF codes into control panel commands and transmits the control panel commands to control panel 114 via transmitter 265. Control then continues to block 999 where the function returns.

Figure 10:
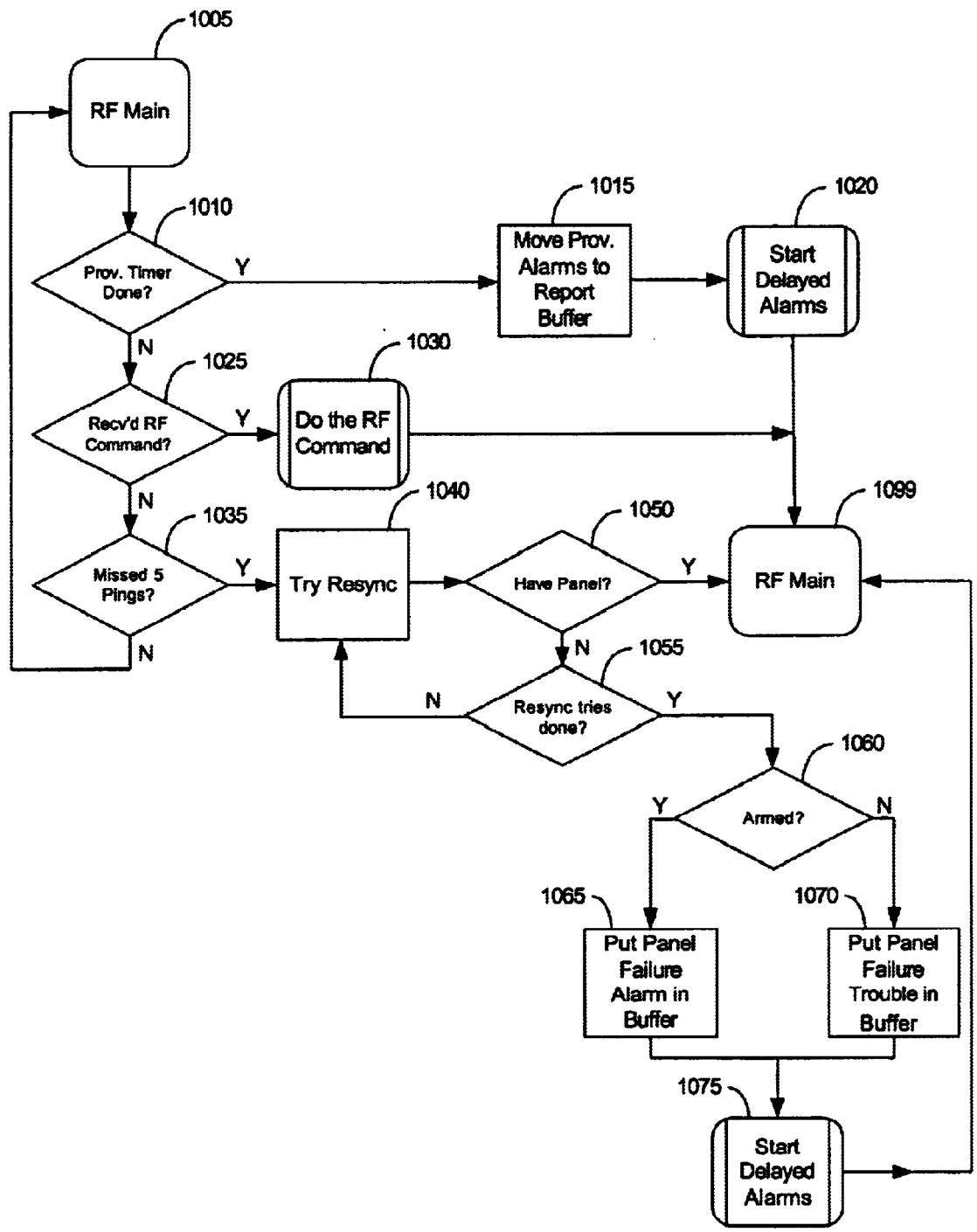
FIG. 10 illustrates a flowchart of the RF main routine of the phone-interface device.

FIG. 10 is a flowchart of the RF main routine of controller 250 in phone-interface device 140. Control begins at block 1005. Control then continues to block 1010 where controller 250 determines whether the provisional timer has expired. If the determination at block 1010 is true, then control continues to block 1015 where controller 250 moves the provisional alarms to the report buffer. Control then continues to block 1020 where controller 250 starts the delayed alarms, as further described below with reference to FIG. 13 at entry block 1305. Referring again to FIG. 10, control then continues to block 1099, which returns to block 1005.

If the determination at block 1010 is false, then control continues to block 1025 where controller 250 determines whether it has received an RF command. If the determination at block 1025 is true, then control continues to block 1030, where controller 250 does the RF command, as further described below with reference to FIGS. 11–19. Control then continues to block 1099, as previously described above.

If the determination at block 1025 is false, then control continues to block 1035 where controller 250 determines whether 5 pings have been missed. If the determination at block 1035 is true, then control continues to block 1040 where controller 250 tries to resync. Control then continues to block 1050 where controller 250 determines whether it has the panel. If the determination at block 1050 is true, the control continues to block 1099, which returns to block 1005, as previously described above.

If the determination at block 1050 is false, then control continues to block 1055 where controller 250 determines whether the resync tries are done. If the determination at block 1055 is false, then control returns to block 1040, as previously described above.

If the determination at block 1055 is true, then control continues to block 1060 where controller 250 determines whether control panel 114 is armed. If the determination at block 1060 is true, the control continues to block 1065 where controller 250 puts the panel failure alarm in the buffer. Control then continues to block 1075 where delayed alarms are started, as described below with reference to FIG. 13 at entry block 1305.

If the determination at block 1060 is false, then control continues to block 1070 where controller 250 puts panel failure trouble in the buffer. Control then continues to block 1075, as previously described above.

Figure 11:
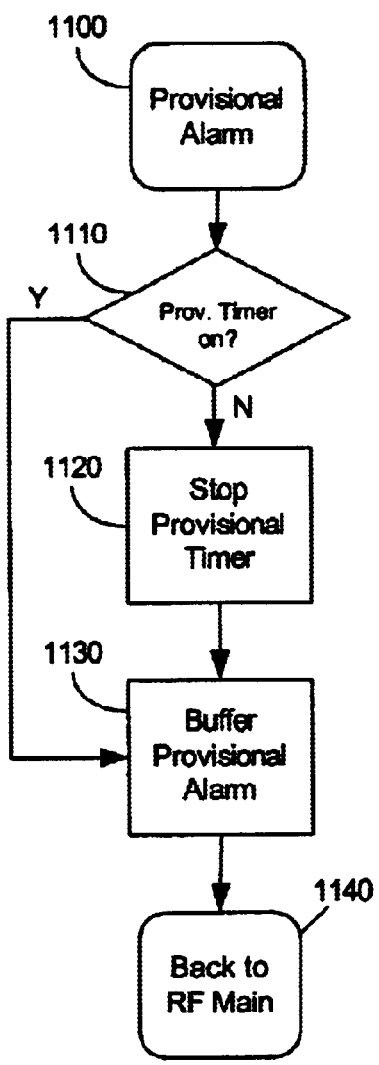
FIG. 11 is a flowchart of the Provisional Alarm routine of the phone-interface device.

FIG. 11 is a flowchart of the Provisional Alarm routine of controller 250 in phone-interface device 140. Control begins at block 1100. Control then continues to block 1110 where controller 250 determines whether the provisional timer is on. If the determination at block 1110 is false, then control continues to block 1120 where controller 250 starts the provisional timer. Control then continues to block 1130 where controller 250 buffers the provisional alarm. Control then continues to block 1140 where controller 250 returns to the RF Main routine, as previously described above with reference to FIG. 10.

Referring again to FIG. 11, if the determination at block 1110 is true, then control continues directly from block 1110 to block 1130, as previously described above.

Figure 12:
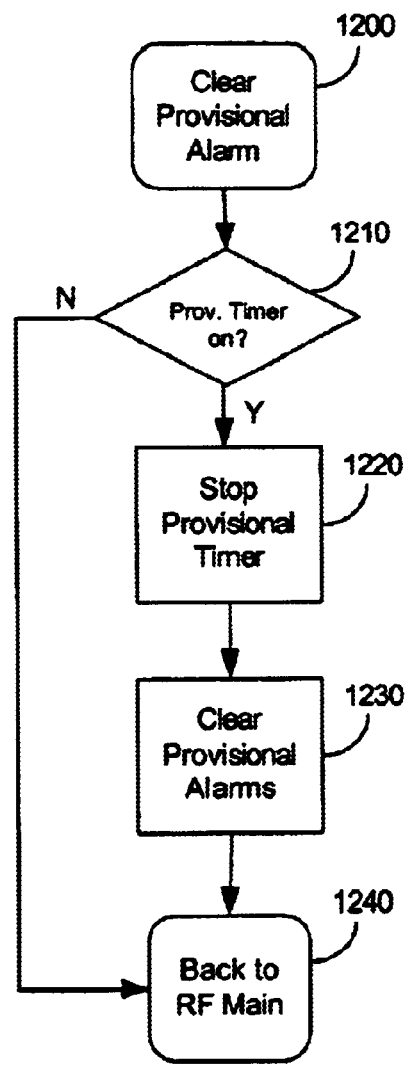
FIG. 12 illustrates a flowchart of the Clear Provisional Alarm routine of the phone-interface device.

FIG. 12 is a flowchart of the Clear Provisional Alarm routine of controller 250 in phone-interface device 140. Control beings at block 1200. Control then continues to block 1210 where controller 250 determines if the provisional timer is on. If the determination at block 1210 is true, then control continues to block 1220 where controller 250 stops the provisional timer. Control then continues to block 1230 where controller 250 clears the provisional alarms. Control then continues to block 1240 where controller 250 returns to the RF Main routine, as previously described above with reference to FIG. 10.

Referring again to FIG. 12, if the determination at block 1210 is false, then control continues directly to block 1240, as previously described above.

Figure 13:
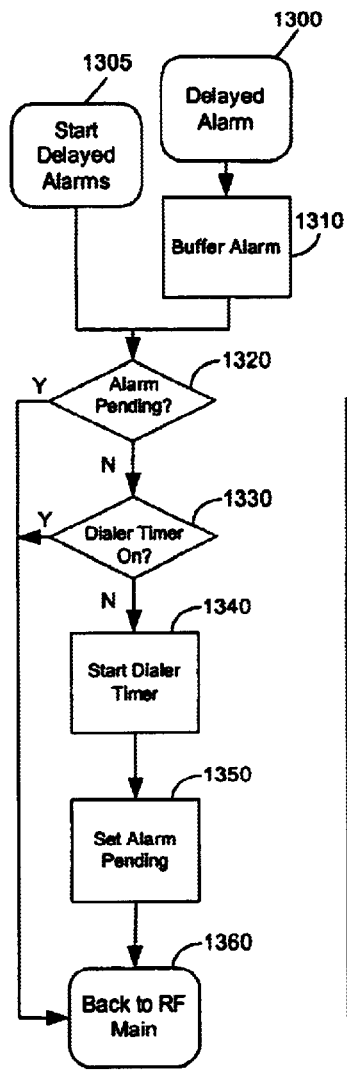
FIG. 13 illustrates a flowchart of the Delayed Alarm and Start Delayed Alarms routines of the phone-interface device.

FIG. 13 is a flowchart of the Start Delayed Alarms and Delayed Alarm routines of controller 250 in phone-interface device 140. Control begins at block 1300 for the Delayed Alarm routine and at block 1305 for the Start Delayed Alarms routine. From block 1300, control continues to block 1310 where controller 250 buffers the alarm. Control then continues to block 1320 where controller 250 determines whether an alarm is pending. If the determination at block 1320 is false, then control continues to block 1330 where controller 250 determines whether the dialer timer is on. If the determination at block 1330 is false, then control continues to block 1340 where controller 250 starts the dialer timer. Control then continues to block 1350 where controller 250 sets alarm pending. Control then continues to block 1360 where controller 250 returns to the RF Main routine, as previously described above with reference to FIG. 10.

Referring again to FIG. 13, if the determination at block 1330 is true, then control continues directly from block 1330 to block 1360, as previously described above. If the determination at block 1320 is true, then control continues directly from block 1320 to block 1360, as previously described above.

When the routine is entered at block 1305, control continues directly from block 1305 to block 1320, as previously described above.

Figure 14:
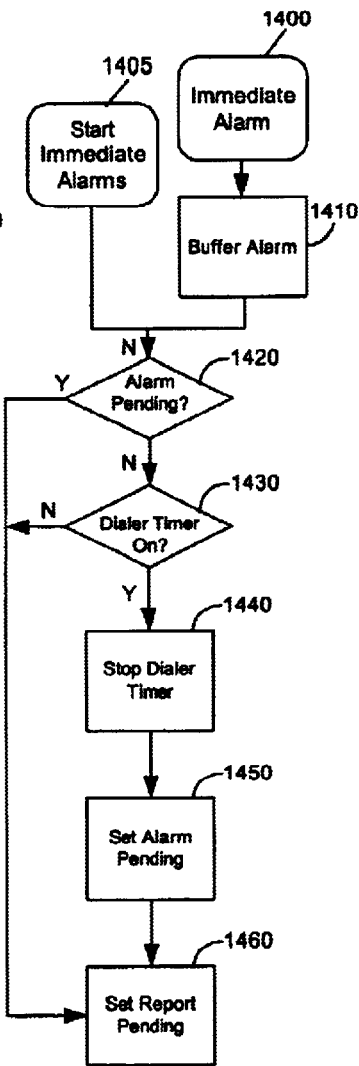
FIG. 14 illustrates a flowchart of the Immediate Alarm and Start Immediate Alarms routines of the phone-interface device.

FIG. 14 is a flowchart of the Immediate Alarm and Start Immediate Alarms routines of controller 250 in phone-interface device 140. Control begins at block 1400 for the Immediate Alarm routine and at block 1405 for the Start Immediate Alarms routine. From block 1400, control continues to block 1410 where controller 250 buffers the alarm. Control then continues to block 1420 where controller 250 determines whether an alarm is pending. If the determination at block 1420 is false, then control continues to block 1430 where controller 250 determines whether the dialer timer is on. If the determination at block 1430 is true, then control continues to block 1440 where controller 250 stops the dialer timer. Control then continues to block 1450 where controller 250 sets alarm pending. Control then continues to block 1460 where controller 250 sets report pending. Control then continues to block 1470 where controller 250 sets a flag to do the report. Control then continues to block 1480 where controller 250 returns to the RF Main routine, as previously described above with reference to FIG. 10.

Referring again to FIG. 14, if the determination at block 1430 is false, then control continues directly from block 1430 to block 1460, as previously described above. If the determination at block 1420 is true, then control continues directly from block 1420 to block 1460, as previously described above.

When the routine is entered at block 1405, control continues directly from block 1405 to block 1420, as previously described above.

Figure 15:
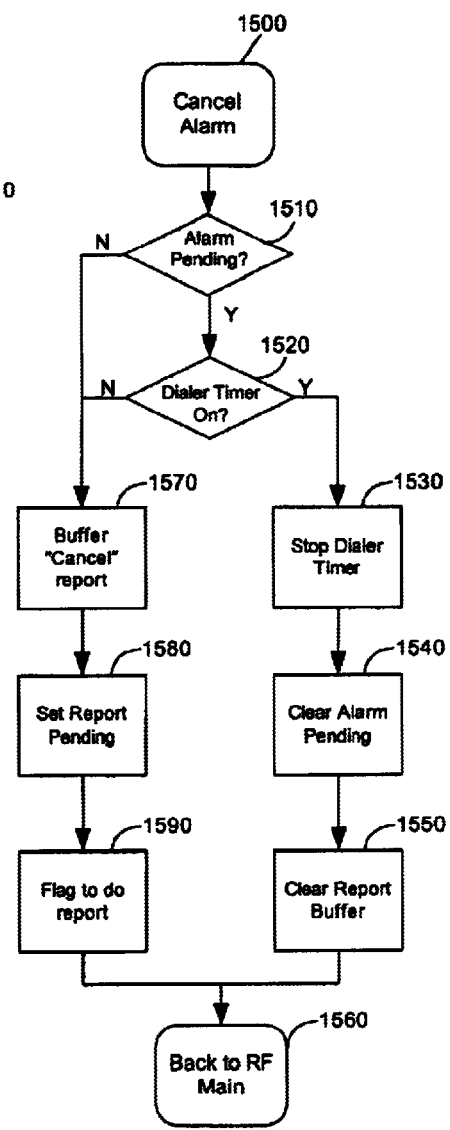
FIG. 15 illustrates a flowchart of the Cancel Alarm routine of the phone-interface device.

FIG. 15 is a flowchart of the Cancel Alarm routine of controller 250 in phone-interface device 140. Control begins at block 1500. Control then continues to block 1510 where controller 250 determines whether an alarm is pending. If the determination at block 1510 is true, then control continues to block 1520 where controller 250 determines whether the dialer timer is on. If the determination at block 1520 is true, the control continues to block 1530 where controller 250 stops the dialer timer. Control then continues to block 1540 where controller 250 clears alarm pending. Control then continues to block 1550 where controller 250 clears the report buffer. Control then continues to block 1560 where controller 250 returns to the RF Main routine, as previously describe above with reference to FIG. 10.

If the determination at block 1520 is false, then control continues to block 1570 where controller 250 buffers a cancel report. Control then continues to block 1580 where controller 250 sets report pending. Control then continues to block 1590 where controller 250 sets a flag to do the report. Control then continues to block 1560, as previously described above.

If the determination at block 1510 is false, then control continues directly from block 1510 to block 1570, as previously described above.

Figure 16:
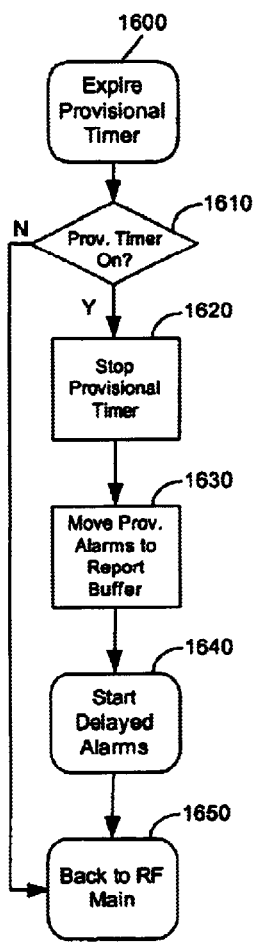
FIG. 16 illustrates a flowchart of the Expire Provisional Timer routine of the phone-interface device.

FIG. 16 is a flowchart of the Expire Provisional Timer routine of controller 250 in phone-interface device 140. Control begins at block 1600. Control then continues to block 1610 where controller 250 determines whether the provisional timer is on. If the determination at block 1610 is true, then control continues to block 1620 where controller 250 stops the provisional timer. Control then continues to block 1630 where controller 250 moves provisional alarms to the report buffer. Control then continues to block 1640 where controller 250 starts delayed alarms. Control then continues to block 1650 where controller 250 returns to the RF Main routine, as previously described above with reference to FIG. 10.

Referring again to FIG. 16, if the determination at block 1610 is false, then control continues directly from block 1610 to block 1650, as previously described above.

Figure 17:
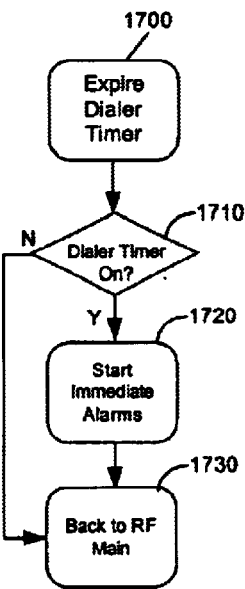
FIG. 17 illustrates a flowchart of the Expire Dialer Timer routine of the phone-interface device.

FIG. 17 is a flowchart of the Expire Dialer Timer routine of controller 250 in phone-interface device 140. Control begins at block 1700. Control then continues to block 1710 where controller 250 determines whether the dialer timer is on. If the determination at block 1710 is true, then control continues to block 1720 where controller 250 starts immediate alarms. Control then continues to block 1730 where controller 250 returns to the RF Main routine, as previously described above with reference to FIG. 10.

Referring again to FIG. 17, if the determination at block 1710 is false, then control continues directly from block 1710 to block 1730, as previously described above.

Figures 18, 19:
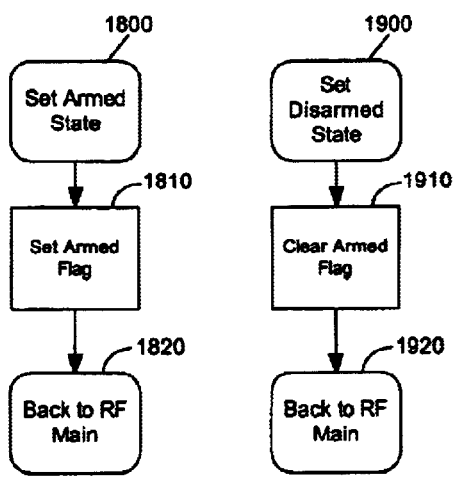
FIG. 18 illustrates a flowchart of the Set Armed State routine of the phone-interface device.
FIG. 19 illustrates a flowchart of the Set Disarmed State routine of the phone-interface device.

FIG. 18 is a flowchart of the Set Armed State routine of controller 250 in phone-interface device 140. Control begins at block 1800. Control then continues to block 1810 where controller 250 sets the armed flag. Control then continues to block 1820 where controller 250 returns to the RF Main routine, as previously described above with reference to FIG. 10.

FIG. 19 is a flowchart of the Set Disarmed State routine of controller 250 in phone-interface device 140. Control begins at block 1900. Control then continues to block 1910 where controller 250 clears the armed flag. Control then continues to block 1920 where controller 250 returns to the RF Main routine, as previously described above with reference to FIG. 10.

Figure 20:
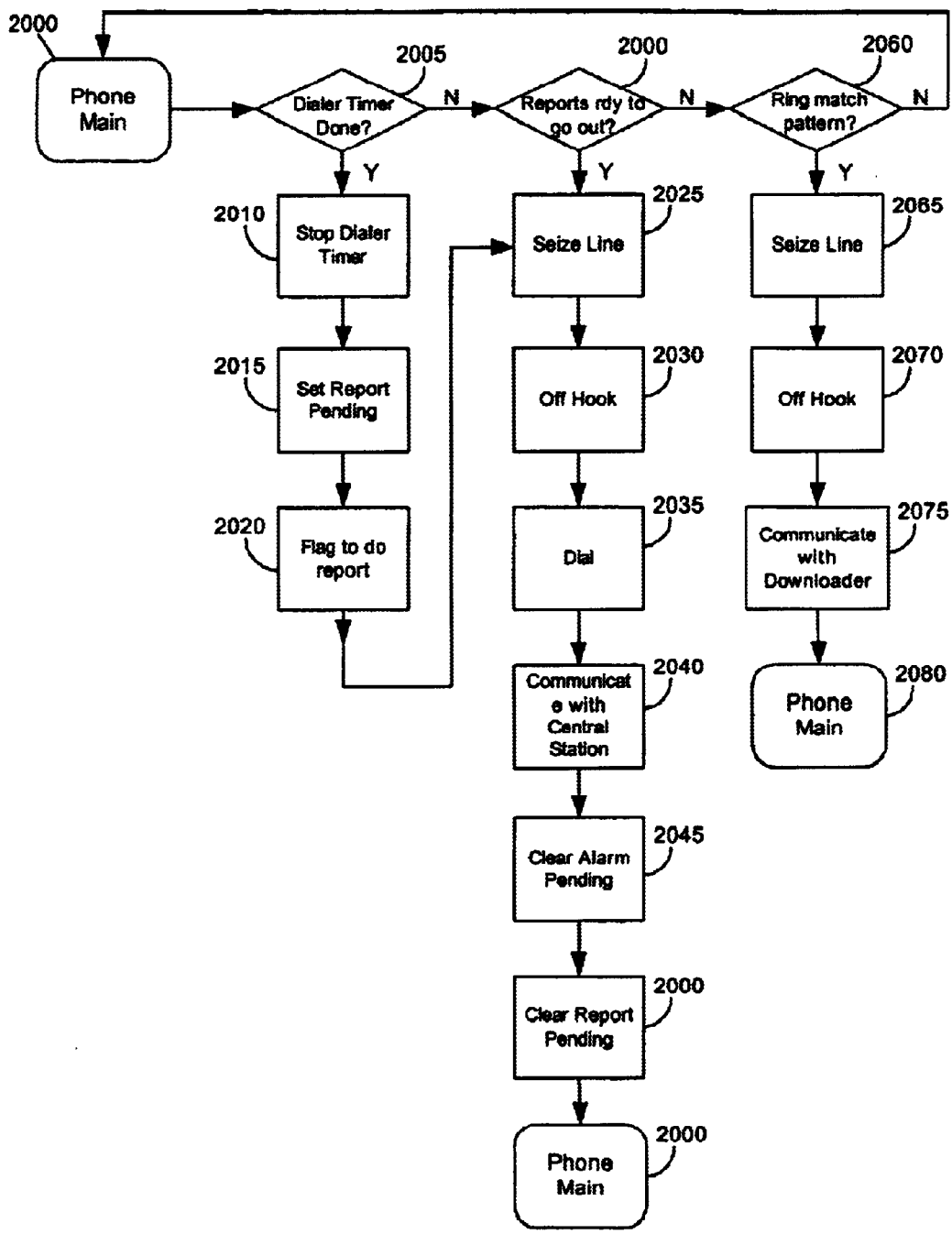
FIG. 20 illustrates a flowchart fo the Phone Main routine of the phone-interface device controller.

FIG. 20 is a flowchart of the Phone Main routine of controller 250 in phone-interface device 140. Control begins at block 2000. Control then continues to block 2005 where controller 250 determines whether the dialer timer is done. If the determination at block 2005 is true, the control continues to block 2010 where controller 250 stops the dialer timer. Control then continues to block 2015 where controller 250 sets report pending. Control then continues to block 2020 where controller 250 sets a flag to do the report.

Control then continues to block 2025 where controller 250 seizes the communications link. Control then continues to block 2030 where controller 250 takes the phone off hook. Control then continues to block 2035 where controller 250 dials the telephone. Control then continues to block 2040 where controller 250 communications with monitoring station 290. Control then continues to block 2045 where controller 2045 clears alarm pending. Control then continues to block 2050 where controller 250 clears report pending. Control then continues to block 2055 where controller 255 returns to block 2000, as previously described above.

If the determination at block 2005 is false, then control continues from block 2005 to block 2057 where controller 250 determines if a report is ready to go out. If the determination at block 2057 is true, then control continues from block 2057 to block 2025, as previously described above.

If the determination at block 2057 is false, then control continues from block 2057 to block 2060 where controller 250 determines whether there is a ring pattern match. If the determination at block 2060 is true, then control continues from block 2060 to block 2065 where controller 250 seizes the communications link. Control then continues to block 2070 where controller 250 takes the telephone off hook. Control then continues to block 2075 where controller 250 communicates with the downloader. Control then continues to block 2080 where controller 250 returns to block 2000, as previously described above.

If the determination at block 2060 is false, then control returns to block 2000, as previously described above.

What is claimed is:

1. A method at a phone-interface device, comprising:

receiving a provisional-alarm report;

determining whether a disarm command has been received subsequent to receipt of the provisional-alarm report;

when a disarm command has not been received before expiration of a period of time, sending a system condition to a monitoring station including seizing a telephone line;

calling the monitoring station via the telephone line;

determining whether the calling element is successful, and when the calling element is not successful, sending the alarm condition to the monitoring station via an alternative communications link; and determining whether a trouble condition exists at the phone interface device and if it exists, communicating the trouble condition to the control panel via a transmitter located at the phone interface device.

2. The method of claim 1, wherein the provisional-alarm report is received via a wireless signal.

3. The method of claim 2, wherein the wireless signal is a radio frequency signal.

4. A phone-interface device, comprising:

a receiver to receive a wireless signal from a control panel, wherein the wireless signal encodes information regarding a system condition;

a transmitter to transmit data via wireless communication about trouble conditions to a receiver at the control panel; and a phone port to connect to a communications link, wherein the phone port is to dial a telephone number of a monitoring station in response to receiving the wireless signal and the communications link is at least one of an ISDN line and wireless.

5. The phone-interface device of claim 4, wherein the communications link is a telephone line.

6. A phone-interface device, comprising:
a phone port to draw electrical energy from a phone line, wherein the phone port is part of a premise phone system, and wherein the electrical energy drawn from the phone line is within a current and voltage profile of the premise phone system; and
a transmitter to transmit data via wireless communication about trouble conditions to a receiver at a control panel.

7. The phone-interface device of claim 6, further comprising:
an energy storage device, wherein the electrical energy drawn from the phone line charges the energy storage device.

8. The phone-interface device of claim 7, wherein the energy storage device is a battery.

9. The phone-interface device of claim 7, wherein the energy storage device is a capacitor.

10. The phone-interface device of claim 7, wherein the electrical energy is drawn from the phone line during a phone line state of ringing.

11. The phone-interface device of claim 7, wherein the electrical energy is drawn while a premise phone is off-hook.

12. The phone-interface device of claim 7, wherein the electrical energy is drawn while the phone port checks the line for proper voltages and currents.

13. The phone-interface device of claim 7, wherein the electrical energy is drawn while the phone port is dialing.

14. The phone-interface device of claim 7, wherein the electrical energy is drawn during a connected call.

15. The phone-interface device of claim 7, wherein the electrical energy is drawn after an off-premise call has hung up.

16. A security system, comprising:
a control panel to receive a sensor event from a security device, to translate the sensor event into a system condition, and to transmit a wireless signal to a phone-interface device, wherein the wireless signal encodes information regarding the system condition; and
a phone-interface device comprising a receiver to receive the wireless signal from the control panel and a transmitter to transmit data via wireless communication about trouble conditions to said control panel receiver, wherein the phone-interface device is packaged separately from the control panel,
wherein the phone-interface device receives direct electric current from an energy storage device.

17. The security system of claim 16, wherein the phone-interface further comprises a phone port to connect to a telephone line, wherein the phone port is to dial a telephone number of a monitoring station in response to receiving the wireless signal.

18. The security system of claim 16, wherein the control panel receives alternating electric current.

19. The security system of claim 16, wherein the energy storage device comprises a battery.

20. The security system of claim 16, wherein the energy storage device comprises a capacitor.

21. The security system of claim 16, wherein the phone-interface device receives electrical power from a telephone line.

22. The security system of claim 16, wherein the phone-interface is mounted in a separate enclosure from the control panel.

23. The security system of 16, wherein the phone-interface device is mounted in a separate enclosure from an input device.

24. The security system of 16, wherein the phone-interface device is mounted in a separate enclosure from a siren.

25. A program product comprising a signal-bearing media bearing instructions, which when read and executed by a processor, comprise:
determining whether a trouble condition exists at a phone interface device and if it exist, communicating the trouble condition to a control panel via a transmitter located at the phone interface device;
receiving a provisional-alarm report at the phone interface device;
determining whether a disarm command has been received subsequent to receipt of the provisional-alarm report;
when a disarm command has not been received before expiration of a period of time, sending a system condition to a monitoring station including seizing a telephone line, and calling the monitoring station via the telephone line; and
determining whether the calling is successful, and when the calling is not successful, sending the alarm condition to the monitoring station via an alternative communications link.

26. The program product of claim 25, wherein the provisional-alarm report is received via a wireless signal.

27. The program product of claim 26, wherein the wireless signal is a radio frequency signal.

* * * * *

UNITED STATES PATENT AND TRADEMARK OFFICE
CERTIFICATE OF CORRECTION

| | |
|---|---|
| PATENT NO. | : 7,054,414 B2 |
| APPLICATION NO. | : 09/845768 |
| DATED | : May 30, 2006 |
| INVENTOR(S) | : Bergman et al. |

It is certified that error appears in the above-identified patent and that said Letters Patent is hereby corrected as shown below:

In Claim 22, column 16, line 16, between "interface" and "is" insert -- device --.
In Claim 25, column 16, line 28, delete "if it exist," and insert therefor -- if it exists, --.

Signed and Sealed this

Eighteenth Day of March, 2008

JON W. DUDAS
*Director of the United States Patent and Trademark Office*